Oct. 19, 1965 E. HAAS 3,212,382
CUTTING MACHINE WITH AUTOMATIC ARM
Filed Sept. 10, 1963 4 Sheets-Sheet 1
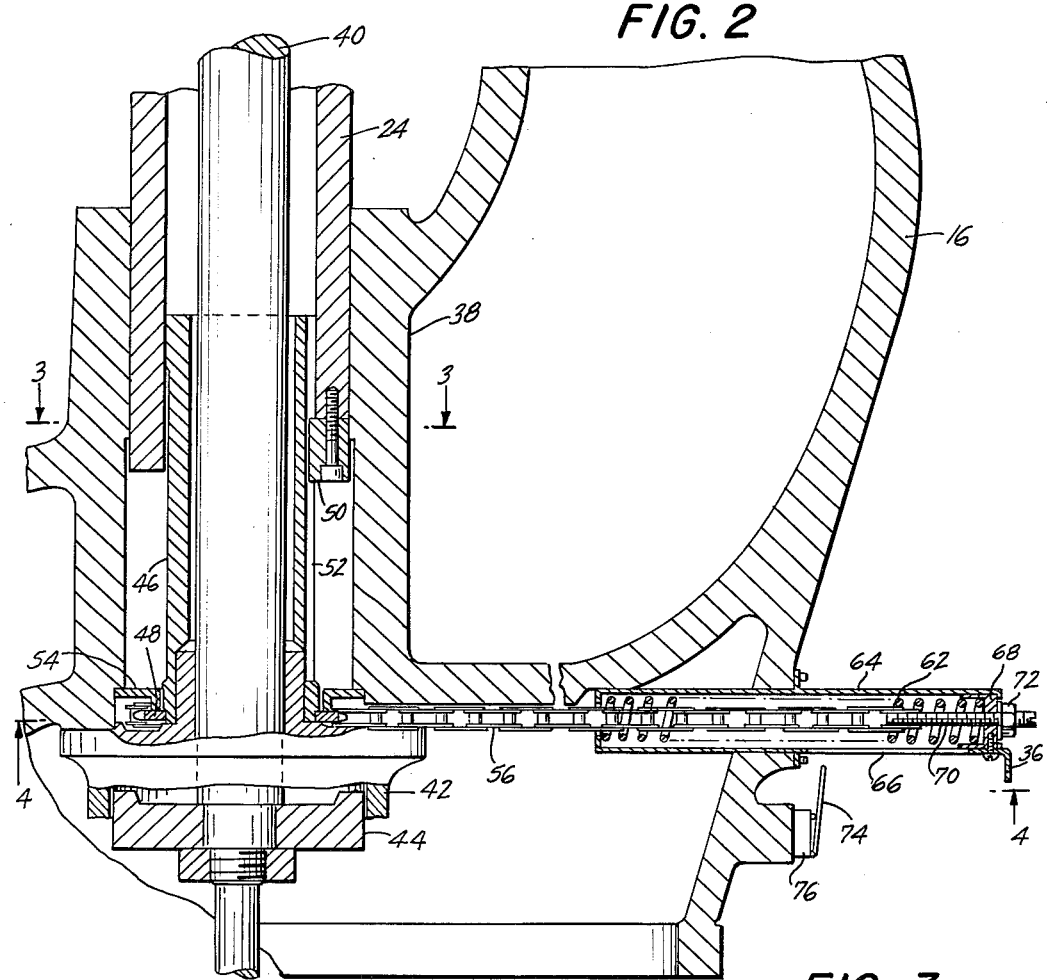
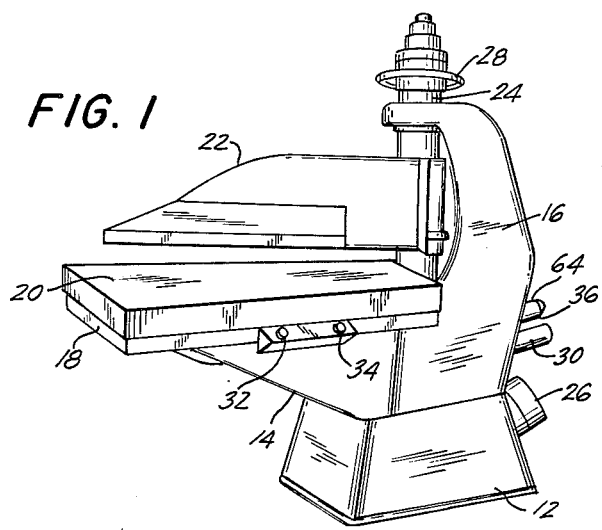
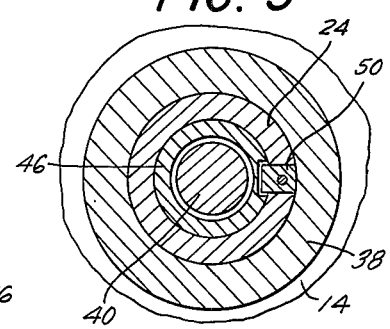
INVENTOR.
EDGAR HAAS
BY James and Franklin
ATTORNEYS INVENTOR.
EDGAR HAAS
BY James and Franklin
ATTORNEYS

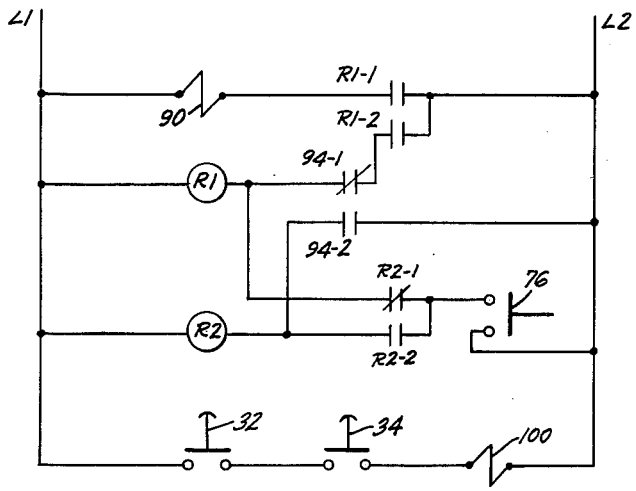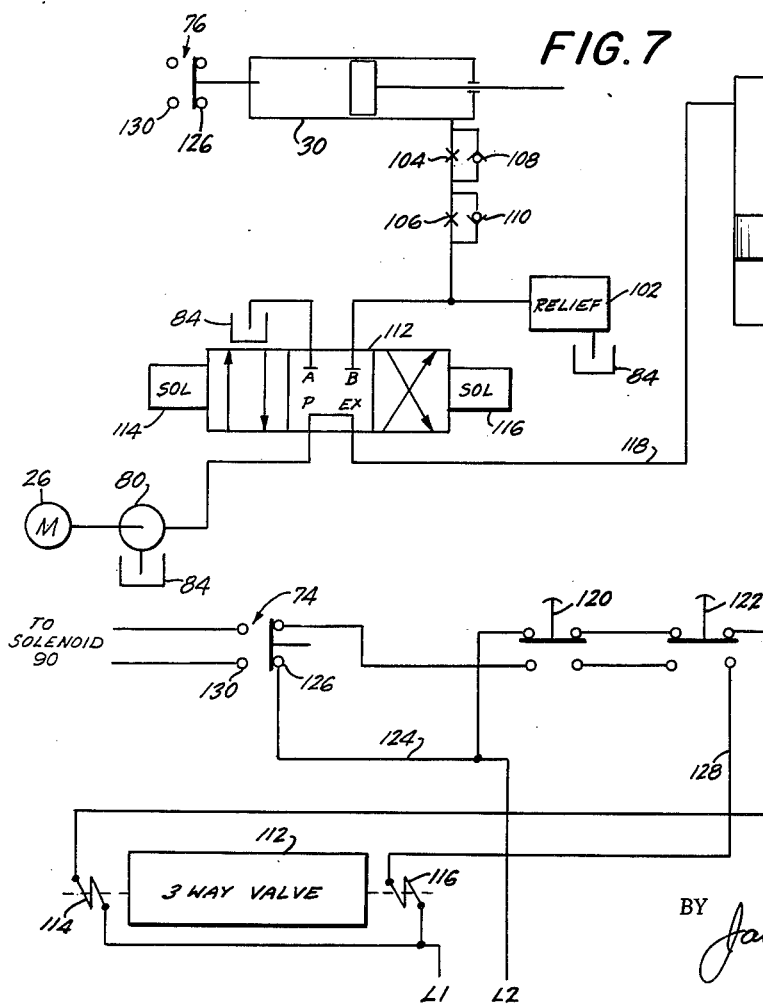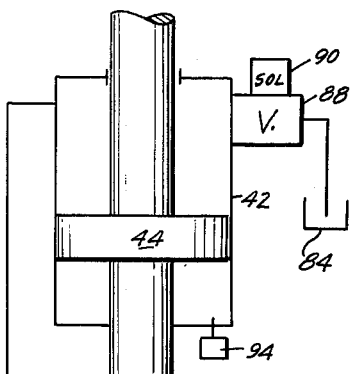

Oct. 19, 1965  E. HAAS  3,212,382
CUTTING MACHINE WITH AUTOMATIC ARM
Filed Sept. 10, 1963  4 Sheets-Sheet 4

INVENTOR.
EDGAR HAAS
BY James and Franklin
ATTORNEYS

United States Patent Office 3,212,382
Patented Oct. 19, 1965

3,212,382
CUTTING MACHINE WITH AUTOMATIC ARM
Edgar Haas, New York, N.Y., assignor to Herman Schwabe, Inc., Brooklyn, N.Y., a corporation of New York
Filed Sept. 10, 1963, Ser. No. 307,998
16 Claims. (Cl. 83—537)

This invention relates to cutting machines, and more particularly to such machines having a swinging arm, sometimes called a "clicker."

The cutting machine comprises a table which receives multiple layers of material to be cut. An operator places loose dies on the material in close or nested arrangement, then swings the arm to a forward position over the dies and table, and then triggers power means for moving the arm downward to force the dies through the material. The arm is swung back and forth manually by means of a handle on the arm. One object of the present invention is to provide power means for swinging the arm, thereby lessening fatigue of the operator.

A further object is to provide a single manual control means to initiate the entire operating cycle of the machine, including the forward swing of the arm, the ensuing cutting stroke, and return of the arm. An ancillary object is to ensure safety, for which purpose the manual control means includes two spaced pushbuttons, one for the left hand and the other for the right hand, both of which must be operated together.

The cutting machine as heretofore made includes a hand wheel near the top of the machine for adjusting the height of the arm. This is important in order to accommodate different thicknesses of material or of multiple plies of material. It also accommodates any change in the height of the table as its wood or equivalent surface wears and is refinished. By appropriate height adjustment, the cut is carried down far enough to just fully penetrate the lowest ply of material, without unnecessarily penetrating the table surface. A further object of the present invention is to provide power means for swinging the arm, which does not interfere with or complicate the convenient adjustment of height heretofore employed.

The earlier cutting machines were mechanically driven, but the more recent machines are more powerful and are hydraulically operated, and a further object is to apply the present invention to cutting machines of the hydraulic type.

With the advent of synthetic material, such as artificial leather, the cutting machine may have to handle wide material, say sixty inches in width, and for this purpose twin arm machines have been developed. With many small dies, one arm is used to operate on one-half the width of the material, whereupon the dies may be shifted and the other arm is used to operate on the remaining half of the material, before moving the web to position a new section of web over the table. However, when using a lesser number of larger dies, it becomes desirable to operate both arms at once, and some dies may straddle the middle of the table where the two arms abut.

In accordance with a further feature and object of the present invention, I provide appropriate controls whereby either arm may be operated independently of the other; and, alternatively, both arms may be operated in unison.

To accomplish the foregoing objects and such other objects as will hereinafter appear, my invention resides in the cutting machine and power and control elements, and their relation one to the other, as are hereinafter more particularly described in the following specification. The specification is accompanied by drawings in which:

FIG. 1 is a perspective view showing a single arm cutting machine embodying features of the invention, with the arm retracted;

FIG. 2 is a fragmentary vertical section taken approximately in the plane of the line 2—2 of FIG. 4;

FIG. 3 is a fragmentary horizontal section taken approximately in the plane of the line 3—3 of FIG. 2;

FIG. 6 is an electrical diagram for the machine;

FIG. 7 is a flow diagram for an alternate or modified form, using a single pump;

FIG. 8 is a partial wiring diagram for the alternate machine shown in FIG. 7;

Figure 4:
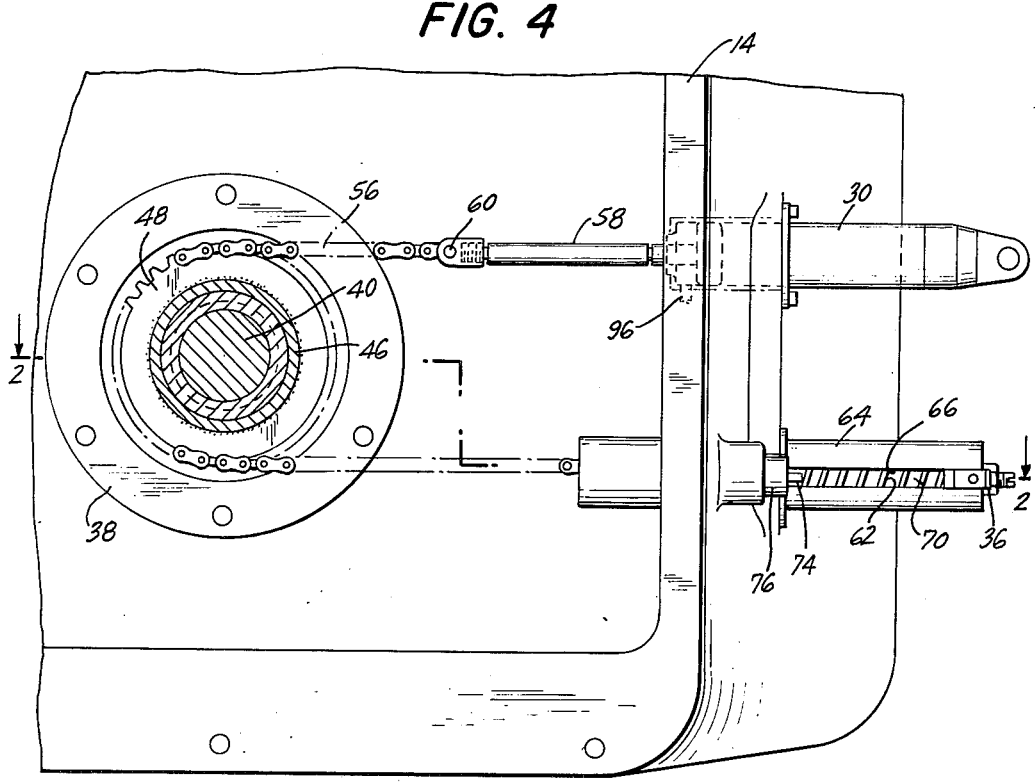
FIG. 4 is an inverted horizontal section taken approximately in the plane of the line 4—4 of FIG. 2.

Referring to the drawing and, more particularly, to FIG. 1, the cutting machine comprises a base 12 carrying a bed 14 with a pedestal 16. The bed 14 includes a table 18 on which a suitable cutting block 20 is mounted, this being made of wood or other suitable material. For convenience the parts 18 and 20 are referred to as the table. The machine includes a horizontal overhung arm 22 swinging about or with a vertical axis or spindle 24. The machine includes a main power means housed in base 12 and including a motor 26, to move the arm 22 vertically in order to force dies through material resting on the block 20 therebeneath. The height of the arm 22 may be precisely adjusted by suitable adjustment means including a hand wheel 28.

There is an auxiliary power means 30 to swing the arm 22 from retracted or rearward position to forward or working position over the table 20. A pair of spaced pushbuttons 32 and 34 for the left and right hands of an operator serve together to control the auxiliary power means 30. There is also a limit means 36 whereby the main power means for cutting the material is automatically responsive to completion of the forward movement of the arm 22.

The auxiliary mechanism may be further described with reference to FIGS. 2, 3 and 4 of the drawing. Referring to those figures, the spindle 24 which carries the overhanging arm is a hollow cylindrical column which is rotatable and vertically movable in a rigid bearing 38. In the present case, the machine is hydraulically operated, and a piston rod 40 passes vertically and coaxially through the column 24. The main power means is a hydraulic cylinder 42 mounted in the frame of the machine, and its piston 44 carrying and serving to drive the piston rod 40. The stop adjustment means shown at 28 in FIG. 1 is part of mechanism connecting the piston rod 40 to the column 24 to afford adjustment of the height of the arm 22 (FIG. 1), the latter being mounted directly and fixedly on the column 24.

As so far described the machine is conventional, but in accordance with the present invention a sleeve 46 of intermediate diameter is disposed between the piston rod 40 and the column 24. The lower end of the sleeve, at a point well below the column 24, carries a sprocket gear 48 which is fixed thereon. The sleeve 46 is splined to the column 24, as indicated here by a key 50 secured to the lower end of the column 24, and vertically slidable in a mating keyway 52 (FIG. 2) in sleeve 46. Thus the vertical cutting movement of the column and arm is afforded, with no accompanying vertical movement of the sprocket gear 48 and sleeve 46, the latter preferably being held against vertical movement. This is done in the present case by means of a fixed bearing 54, but other bearing arrangements may be employed.

A chain 56 extends around the sprocket gear 48, and referring to FIG. 4 (which is a bottom view), a hydraulic actuator 30 has its piston rod 58 connected at 60 to one end of the chain 56. A return spring 62 is connected to the other end of the chain.

Referring also to FIG. 2, spring 62 in this case is a compression spring which is housed in a fixed cylindrical housing 64, the latter preferably being slotted along the bottom, as shown at 66, to accommodate movement of a downwardly projecting finger 36 which acts as a limit means which is later described. The chain 56 passes into the housing 64 and through the compression spring 62. It is connected to a piston-like element 68 which is slidable in cylinder 64 when the spring is compressed. For purposes of adjustment the chain is preferably first connected to a screw 70, which in turn is adjustably received by piston 68, with the aid of a nut 72. Lock nuts may be used, or the screw may be threadedly received in the piston, in which case the nut 72 itself acts as a lock nut.

FIG. 2 also shows that finger 36 is secured rigidly to the piston 68 and projects downward through the slot 66 at the bottom of housing 64. The finger travels along with the piston as the spring is compressed, until finally it engages the feeler 74 of a suitable limit switch 76 which marks the forward position of the arm, and which serves to automatically initiate the cutting operation as is later explained.

Figure 5:
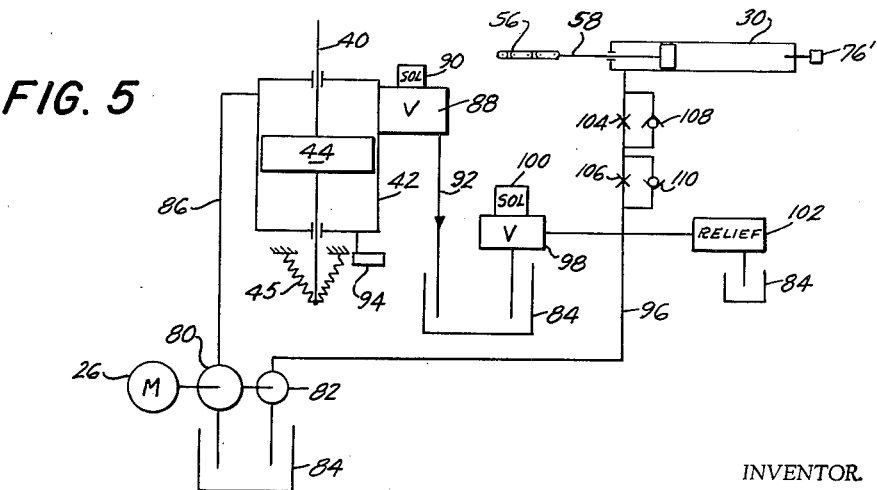
FIG. 5 is a flow diagram for the machine.

Referring now to FIG. 5 of the drawing, the motor 26 drives a main pump 80 for the cutting operation, and an auxiliary pump 82 for the actuator which swings the arm. The pumps may be submerged, and in any case take oil from a tank 84, the same tank being shown at several places in FIG. 5, as is customary in hydraulic diagrams. Main pump 80 leads through pipe 86 to the upper end of main cylinder 42. A two-way valve 88 is operated by a solenoid 90, and when open permits free circulation of the liquid back through pipe 92 to tank 84. When closed the piston 44 is forced down, and through piston rod 40 causes the desired cutting action. A limit switch 94 at the bottom of the main cylinder marks the completion of the cut, and initiates opening of the valve 88, whereupon pull springs 45 cause upward movement of the arm. The pull springs are on both sides of a downward extension of piston rod 40. The main hydraulic mechanism here described is generally conventional.

The auxiliary pump 82 supplies fluid through pipe 96 to a valve 98 operated by a solenoid 100. When the valve is open, the liquid circulates back to tank 84. When valve 98 is closed, the liquid continues to the inner or left end of actuator cylinder 30, the piston of which pulls piston rod 58 and chain 56 toward the right. A limit switch could be provided at 76' to mark the forward position of the arm, but as previously mentioned, in the present machine the limit switch is associated with the compression spring at the other end of the chain.

A pressure relief valve may be provided at 102, with a return flow to tank 84. Flow rate regulating valves may be provided at 104 and 106, these being shunted by check valves 108 and 110 respectively, so that the flow rate for causing forward movement of the arm may be adjusted independently of the flow rate when the arm is being retracted by the compression spring.

The electrical arrangement may be described with reference to FIG. 6. The left and right-hand pushbuttons 32 and 34, when depressed, energize the solenoid 100 of the valve 98 (FIG. 5) controlling the auxiliary actuator. This closes the valve, causing the actuator to swing the arm forward until the limit switch 76 (FIG. 6) is closed, at which time relay coil R1 is energized through the normally closed upper contacts R2–1 of relay R2. This closes contacts R1–1, thereby energizing the solenoid 90 of the main dump valve 88 (FIG. 5), thus closing valve 88 and so causing the desired cutting action.

Meanwhile, the lower contacts R1–2 (FIG. 6) are also closed, and act as holding contacts for relay coil R1, keeping the latter energized through the normally closed contacts 94–1 of the down limit switch 94 (FIG. 5). This ensures completion of the cutting operation regardless of possible release of the manual pushbuttons, or possible opening of limit switch 76, although the latter is unlikely because the pressure of the arm on the dies in the material being cut is alone sufficient to hold the arm against the return pull of the compression spring.

Completion of the cut is marked by operation of the down limit switch 94. This opens the normally closed contacts 94–1, thereby deenergizing relay coil R1. The normally open contacts R1–1 then open, thereby deenergizing solenoid 90, and the arm rises.

Meanwhile the buttons 32 and 34 have been released, deenergizing solenoid 100, and opening valve 98 (FIG. 5), so that when the arm rises it is pulled back by the compression spring 62 (FIG. 4).

In FIGS. 5 and 6, it is assumed that an auxiliary pump is provided for the auxiliary actuator. FIGS. 7 and 8 show a somewhat modified arrangement in which a single hydraulic pump serves for both cylinders. Referring to FIG. 7, motor 26 drives pump 80 which draws liquid from tank 84. The two-way valve 98 of FIG. 5 is replaced by a four-way valve 112, the spool of which is moved to the left by a solenoid 114, and is moved to the right by a solenoid 116. It is normally centered by a spring, not shown. The main cylinder 42, piston 44, limit switch 94, dump valve 88, solenoid 90, the auxiliary actuator 30, relief valve 102, flow regulating valves 104 and 106 with check valves 108 and 110, all correspond to the similarly numbered parts in FIG. 5.

The flow diagram of FIG. 7 shows the valves in rest position, with solenoid 114 energized, and solenoid 116 deenergized, the valve having three positions and being spring-centered. In rest position oil flows from port P to port A and back to the tank 84. Port B is connected to port Ex, and then through pipe 118 to the upper end of the main cylinder 42, and thence back through open valve 88 back to the tank 84.

Referring now to the wiring diagram in FIG. 8, when the pushbuttons 120 and 122 are depressed, they energize solenoid 116, the circuit being from line L2 through conductor 124, normally closed limit switch contacts 126, the lower contacts of the pushbuttons, and then back through conductor 128 to solenoid 116, and then line L1.

Reverting to FIG. 7, the valve spool then moves to the right, and the oil flow now is from port P to port B and thence through the regulating valve 104 to the actuator 30, which swings the arm forward. In its forward position, the limit switch 76 is operated, and returning to FIG. 8, the contacts 126 of limit switch 76 are opened, which deenergizes valve solenoid 116. The contacts 130 are closed, and these contacts energize the solenoid 90 (FIG. 7) of main valve 88, thereby initiating the cutting stroke. Additional parts of FIG. 6 are not repeated in FIG. 8, including the bottom limit switch 94 which terminates the cutting stroke and restores the arm to its upward position.

Meanwhile, solenoid 114 may remain deenergized because of continued depression of the pushbuttons 120 and 122, the action of the machine being fast. The valve 112 then assumes its center position; and reverting to FIG. 7, the oil flow then is from port P to port Ex, and thence through pipe 118 to cylinder 42. The action of the back contacts 130 of the limit switch 76 energizes solenoid 90 of the main dump valve 88, causing the valve to close and so causing the cutting operation. The limit switch 94 at the bottom of the cylinder 42 causes upward movement of the arm by means of the usual circuitry, much as described in FIG. 6. When the arm rises the pushbuttons 120 and 122 have been released and the arm moves back. If not, the operator would see the arm rise and remain forward, and so would be reminded to release the pushbuttons for retraction of the arm. If desired, the down limit switch 94 of the main cylinder may be interlocked to insure retraction as well as upward movement of the arm, even if the buttons are held depressed, but this is not important or needed.

Figure 9:
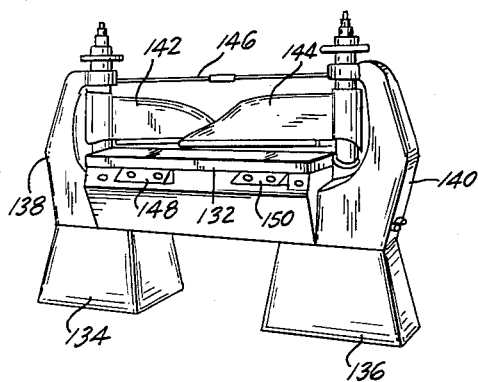
FIG. 9 is a perspective view of a twin arm machine with overlapping arms.

Referring now to FIG. 9, I there show a twin arm machine having a relatively long table 132 rigidly connecting bases 134 and 136 with pedestals 138 and 140 carrying arms 142 and 144. The pedestals may be connected by a tie rod 146. In effect, there are two single-arm cutting machines disposed end to end, with main cylinders and auxiliary cylinders, but only one tank and motor are needed. In FIG. 9 the arms overlap somewhat, that is, they are somewhat longer than half the distance between the upright columns on which they turn. Such a machine is intended to handle a wide web of material, typically sixty inches in width. One arm is used at a time, the other remaining in its retracted position where it is out of the way. A considerable number of small dies are advantageously placed on the material for about half the width of the web, and the appropriate arm is operated and retracted. The dies are then placed in most economic disposition on the remaining half of the web, and the other arm is operated and retracted. The web of material (or webs, because it is customary to use multiple plies) is moved up an amount corresponding to the width of the table 132, which may be, say thirty inches, and the entire operation is repeated.

Such a machine has two pushbuttons at 148 for controlling the arm 142, and another similar pair of pushbuttons 150 for controlling the right arm 144. The flow diagram of FIG. 5 or 7, and the corresponding electrical diagram of FIG. 6 or 8, are fully applicable to the twin arm machine of FIG. 9, the wiring and solenoids and valves being duplicated.

The electrical diagrams have not included the main driving motor and its starter. These are conventional and require no description because it is customary to let the motor run continuously whenever the machine is in operation. The motor is simply started at the beginning of a work day, and the motor circuit (usually a three-phase circuit) is not involved in the control circuitry previously described. Thus, in the machine of FIG. 9, even if only a single motor and pump and tank are employed, that fact does not alter the circuitry previously described, and the said circuitry and solenoid-operated valves are used in duplicate. More specifically, in FIG. 5 the pipe 86 leading from the main pump to the main cylinder would branch and lead to two main cylinders; and the pipe 96 leading from the auxiliary pump to the auxiliary actuator would branch and lead to two such actuators.

Figure 10:
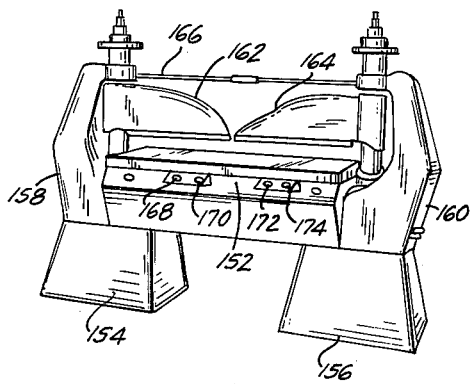
FIG. 10 is a similar view for a twin arm machine with abutting arms.

Reference next is made to FIG. 10 which shows a somewhat different twin arm machine. As before, a single long table 152 is rigidly mounted on bases 154 and 156, which also carry pedestals 158 and 160, for arms 162 and 164, the columns being additionally supported by a tie rod 166. However, in this case the arms 162 and 164 are somewhat shorter and can swing into abutting relation over the table 152.

This machine is somewhat more versatile than that shown in FIG. 9, and may be used in several ways. It is provided with four spaced pushbuttons 168, 170, 172 and 174. The first and second buttons together serve to cause actuation of the left arm 162; the third and fourth pushbuttons 172 and 174 together serve to cause actuation of the right arm 164; and simultaneous operation of the second and third pushbuttons 170 and 172 together serve to simultaneously operate both arms 162 and 164. When a large number of small dies are being used, the arms are operated one at a time, as described in connection with FIG. 9. However, when a lesser number of larger dies are to be employed, these may be appropriately disposed over the entire table instead of half the table, and both arms may be operated simultaneously.

Figure 11:
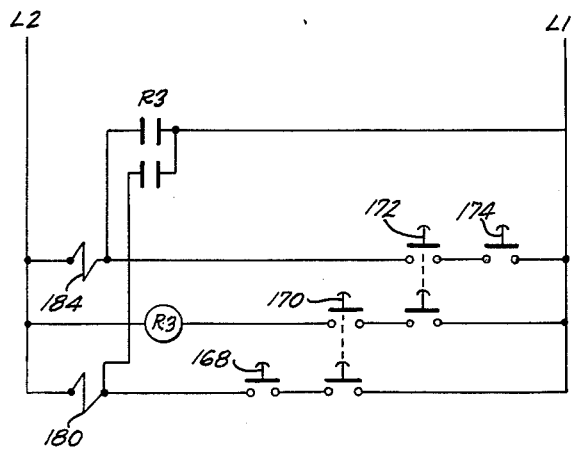
FIGS. 11 and 12 are electrical diagrams for the twin arm machine shown in FIG. 10.
Figure 12:
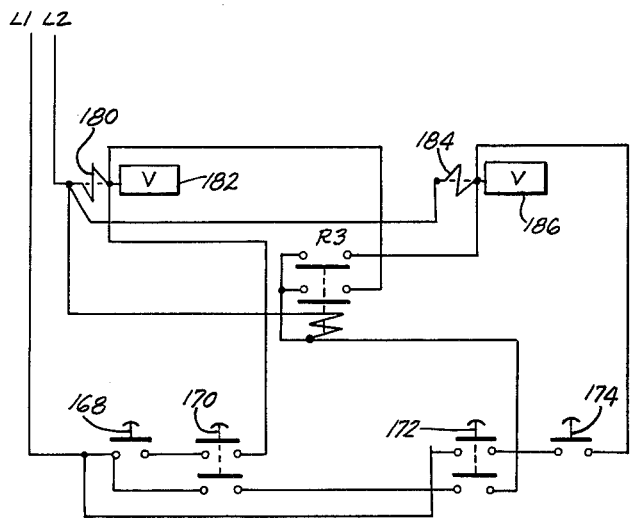

The electrical diagram for this machine may be described with reference to FIGS. 11 and 12. The four pushbuttons are shown at 168, 170, 172 and 174. Depression of buttons 168 and 170 closes a circuit through the solenoid 180 of the valve 182 in order to close the valve for swinging the left arm 162 forward. Closing the buttons 172 and 174 energizes the solenoid 184 of the valve 186 in order to close the valve which swings the right arm 164 forward. Closing of buttons 170 and 172 energizes the coil of relay R3, thereby closing the normally open upper and lower contacts of relay R3. The upper contacts energize solenoid 184, and at the same time the lower contacts energize the lower contacts 180, causing simultaneous operation of both arms.

It will be understood that the actuators which move the arms again have limit switches to initiate the cutting operation, and that the main upright cylinders again have limit switches which return the arms upward, all as previously described for the single arm machine.

It will be understood that while I have shown the control pushbuttons on the bed of the machine in all cases, they may be located elsewhere if desired. It will also be understood that where safety regulations do not require spaced pushbuttons, and if an operator so prefers, a single pushbutton may be employed. In such case, the machine of FIG. 10 would have three pushbuttons, one for the left arm, one for the right arm, and a middle pushbutton for the relay which has two sets of contacts for operating both arms.

It is believed that the construction and operation and method of use of my improved cutting machines, as well as the advantages of the same, will be apparent from the foregoing detailed description. It will also be apparent that while I have shown and described the invention in several preferred forms, changes may be made in the structures and circuitry shown without departing from the scope of the invention, as sought to be defined in the following claims.

I claim:

1. A cutting machine of the type having a horizontal overhung arm swinging about a vertical axis, said machine including a main power means to move the arm vertically to force dies through material therebeneath, a control means for said main power means, an auxiliary power means to swing the arm from retracted to forward position, a manual means for controlling said auxiliary power means, and limit means whereby the control means for said main power means is automatically responsive to completion of the forward movement of the arm.

2. A cutting machine as defined in claim 1 in which the overhung arm is carried by a vertical spindle, a sprocket gear secured to said spindle for causing rotation of said spindle and with it the arm, a chain around said sprocket gear, an hydraulic actuator connected to one end of said chain, means connected to the other end of the chain to exert a return pull on the chain, and in which the limit means is a limit switch responsive to completion of movement of the arm to its forward position.

3. A cutting machine as defined in claim 1 in which the arm is carried by a hollow cylindrical column having a piston rod passing coaxially therethrough, and in which the main power means is an hydraulic cylinder and piston in the base of the machine carrying the piston rod, means at the upper ends of the piston rod and column including threaded adjustable means connecting the same and affording adjustment of the height of the arm, a sleeve of intermediate diameter between the piston rod and the column, said sleeve below the column and above the cylinder carrying a sprocket gear and being splined to the column to accommodate vertical cutting movement of the arm and column, with no accompanying vertical movement of the sprocket gear, a chain around said sprocket gear, an hydraulic actuator connected to one end of the chain and acting as the auxiliary power means, and means connected to the other end of the chain to exert a return pull on the chain.

4. A cutting machine as defined in claim 3 in which a main motor drives a main pump and an auxiliary pump, and in which the main pump is connected to the main cylinder and in which the auxiliary pump is connected to the auxiliary cylinder, and in which each cylinder has a solenoid-operated two-way valve for either causing or preventing free circulation of the hydraulic fluid leaving the respective pump.

5. A cutting machine as defined in claim 3 in which a main motor drives a pump and in which the pump is connected to a three-position four-way valve operated by two solenoids and a centering spring, and in which in one position the hydraulic fluid is supplied to the actuator for swing the arm, and in which in another position hydraulic fluid is supplied to the main cylinder for the cutting operation, and in which in a third position the hydraulic fluid is freely circulated.

6. A cutting machine having left and right swinging arms arranged in end-to-end abutting relation over a single table, each of said arms having operating mechanism as defined in claim 1, the said manual means including four spaced pushbuttons, the first and second buttons together serving to cause actuation of the left arm, the third and fourth buttons together serving to cause actuation of the right arm, and the second and third buttons togther serving to cause simultaneous operation of both arms.

7. A cutting machine having left and right swinging arms arranged in end-to-end abutting relation over a single table, each of said arms having operating mechanism as defined in claim 1, the said manual means including four spaced pushbuttons, the first and second buttons together serving to cause actuation of the left arm, the third and fourth buttons together serving to cause actuation of the right arm, and the second and third buttons together serving to energize a relay having two sets of contacts, one set being connected to the mechanism of the first arm, and the other set being connected to the mechanism of the second arm, whereby both arms are operated simultaneously.

8. A cutting machine of the type having a horizontal overhung arm swinging about a vertical axis, said machine including a main power means to move the arm vertically to force dies through material therebeneath, a control means for said main power means, an auxiliary power means to swing the arm from retracted to forward position, a pair of spaced pushbuttons for the left and right hands of an operator for together controlling said auxiliary power means, and limit means whereby the control means for said main power means is automatically responsive to completion of the forward movement of the arm.

9. A cutting machine as defined in claim 8 in which the overhung arm is carried by a vertical spindle, a sprocket gear secured to said spindle for causing rotation of said spindle and with it the arm, a chain around said sprocket gear, a hydraulic actuator connected to one end of said chain, means connected to the other end of the chain to exert a return pull on the chain, and in which the limit means is a limit switch responsive to completion of movement of the chain to a position corresponding to the forward position of the arm, said sprocket gear being splined to said spindle in order to accommodate vertical cutting movement of the arm.

10. A cutting machine of the type having a horizontal overhung arm carried by and swinging about the axis of a vertical spindle, a sprocket gear secured to said spindle for causing rotation of said spindle and with it the arm, a chain around said sprocket gear, a hydraulic actuator connected to one end of said chain, means connected to the other end of the chain to exert a return pull on the chain, and a manual means for controlling said actuator.

11. A cutting machine of the type having a horizontal overhung arm carried by and swinging about the axis of a vertical spindle, said machine including a main power means to move the arm vertically to force dies through material therebeneath, a control means for said main power means, an auxiliary power means to swing the arm from retracted to forward position, and an additional manual means independent of the aforesaid control means for controlling said auxiliary power means, said auxiliary power means including a sprocket gear secured to said spindle for causing rotation of said spindle and with it the arm, a chain around said sprocket gear, a hydraulic actuator connected to one end of said chain, and means connected to the other end of the chain to exert a return pull on the chain, said sprocket gear being splined to said spindle in order to accommodate vertical cutting movement of the arm.

12. A cutting machine of the type having a horizontal overhung arm swinging about a vertical axis, said machine including a main power means to move the arm vertically to force dies through material therebeneath, a control means for said main power means, an auxiliary power means to swing the arm from retracted to forward position, and an additional manual means independent of the aforesaid control means for controlling said auxiliary power means, said arm being carried by a hollow-cylindrical column having a piston rod passing coaxially therethrough, said main power means including an hydraulic cylinder and piston in the base of the machine carrying the piston rod, and adjustable means at the upper ends of the piston rod and column connecting the same and affording adjustment of the height of the arm, said auxiliary power means including a sleeve of intermediate diameter between the piston rod and the column, said sleeve below the column and above the cylinder carrying a sprocket gear and being splined to the column to accommodate vertical cutting movement of the arm and column, with no accompanying vertical movement of the sprocket gear, a chain around said sprocket gear, an hydraulic actuator connected to one end of the chain and acting as the auxiliary power means, and means connected to the other end of the chain to exert a return pull on the chain, and a manual means for controlling said actuator.

13. A cutting machine as defined in claim 12 in which a main motor drives a main pump and an auxiliary pump, and in which the main pump is connected to the main cylinder and in which the auxiliary pump is connected to the auxiliary cylinder, and in which each cylinder has a solenoid-operated two-way valve for either causing or preventing free circulation of the hydraulic fluid leaving the respective pump.

14. A cutting machine as defined in claim 12 in which a main motor drives a pump, and in which the pump is connected to a three-position four-way valve operated by two solenoids and a centering spring, and in which in one position the hydraulic fluid is supplied to the actuator for swinging the arm, and in which in another position hydraulic fluid is supplied to the main cylinder for the cutting operation, and in which in a third position the hydraulic fluid is freely circulated.

15. A cutting machine of the type having left and right horizontal overhung arms each swinging about a vertical axis, said machine including power means to swing each arm from retracted to forward position, and a manual means for controlling each power means, said left and right swinging arms being arranged in end-to-end abutting relation over a single table, the said manual means including four spaced pushbuttons, the first and second buttons together serving to cause actuation of the left arm, the third and fourth buttons together serving to cause actuation of the right arm, and the second and third buttons together serving to cause simultaneous operation of both arms.

16. A cutting machine of the type having left and right horizontal overhung arms each swinging about a vertical axis, said machine including power means to swing each arm from retracted to forward position, and a manual means for controlling each power means, said left and right swinging arms being arranged in end-to-end abutting relation over a single table, the said manual means including four spaced pushbuttons, the first and second buttons together serving to cause actuation of the left arm, the third and fourth buttons together serving to cause actuation of the right arm, and the second and third buttons together serving to energize a relay having two sets of contacts, one set of contacts being connected to the mechanism of the first arm, and the other set of contacts being connected to the mechanism of the second arm, whereby both arms are operated simultaneously.

References Cited by the Examiner

UNITED STATES PATENTS 2,213,914  9/40  Hoza _____ 83—537

ANDREW R. JUHASZ, *Primary Examiner.*